May 9, 1933.　　A. J. PINTO　　1,907,662
AUTOMOBILE TOP
Filed Oct. 22, 1931　　6 Sheets-Sheet 6
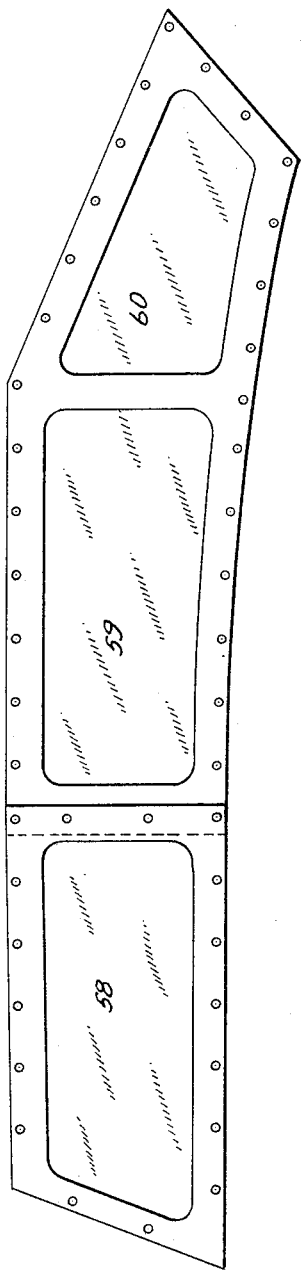
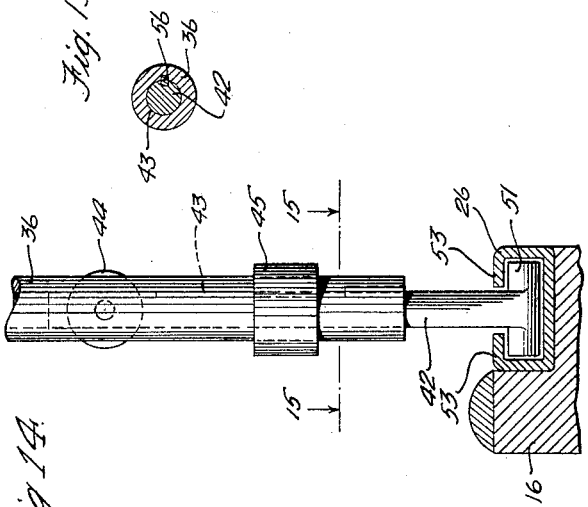
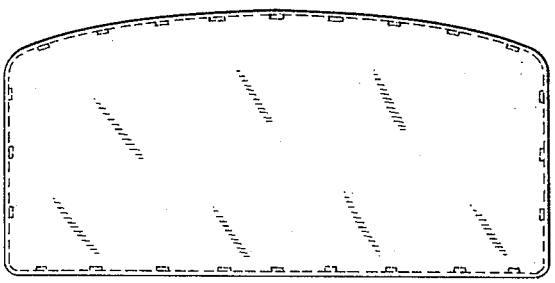
INVENTOR
Angelo J. Pinto
BY　ATTORNEY
Moses & Nolte Patented May 9, 1933

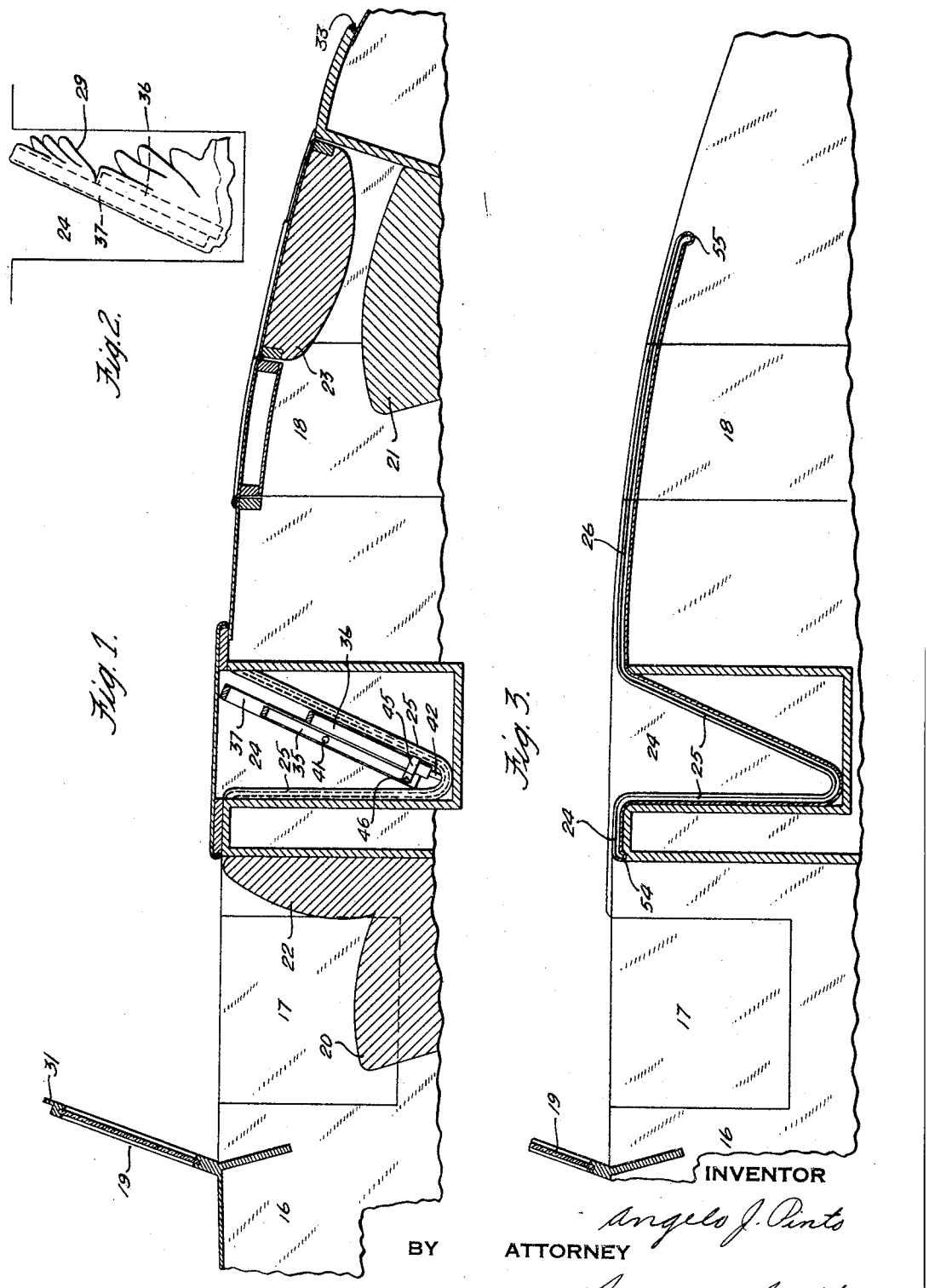

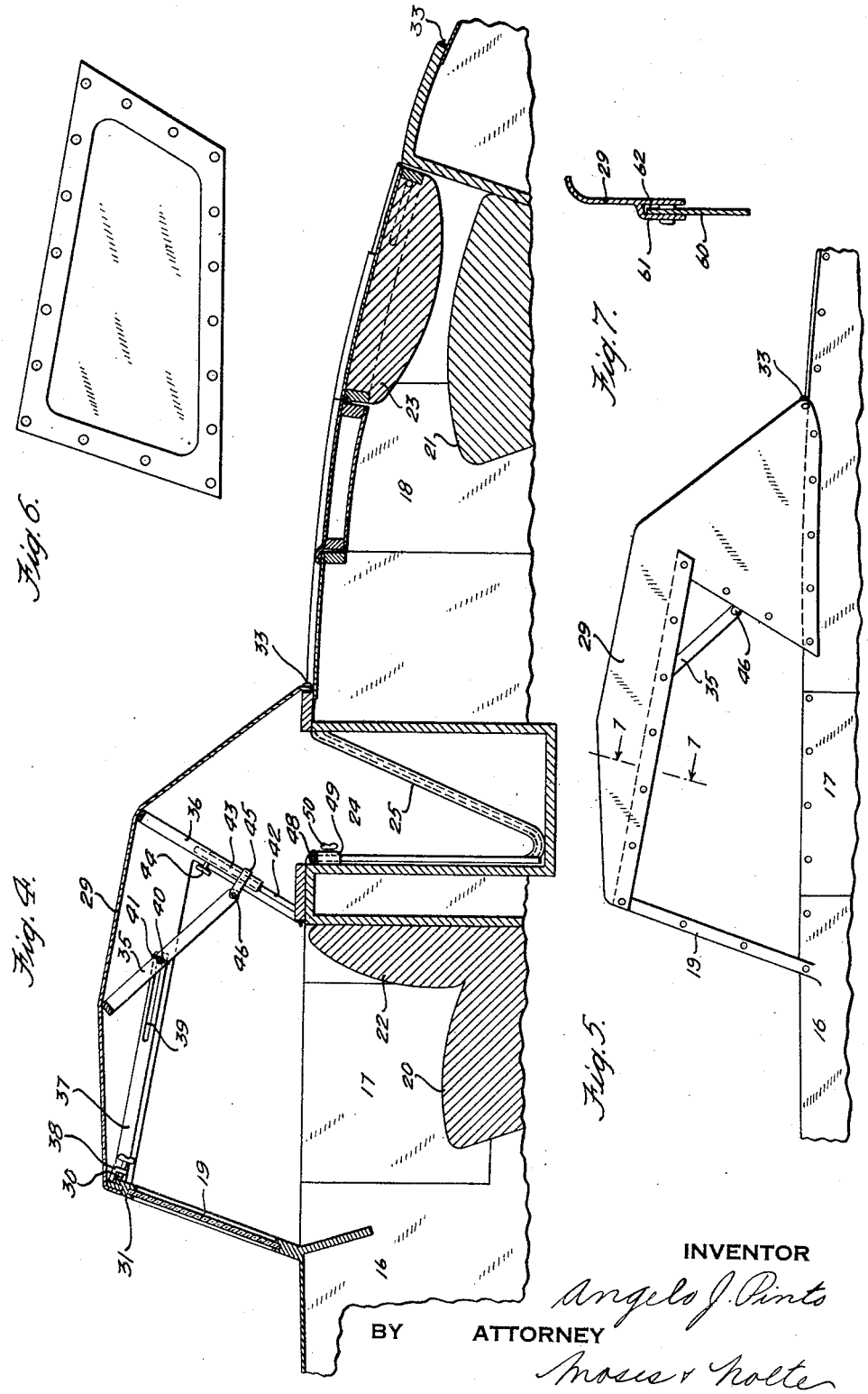

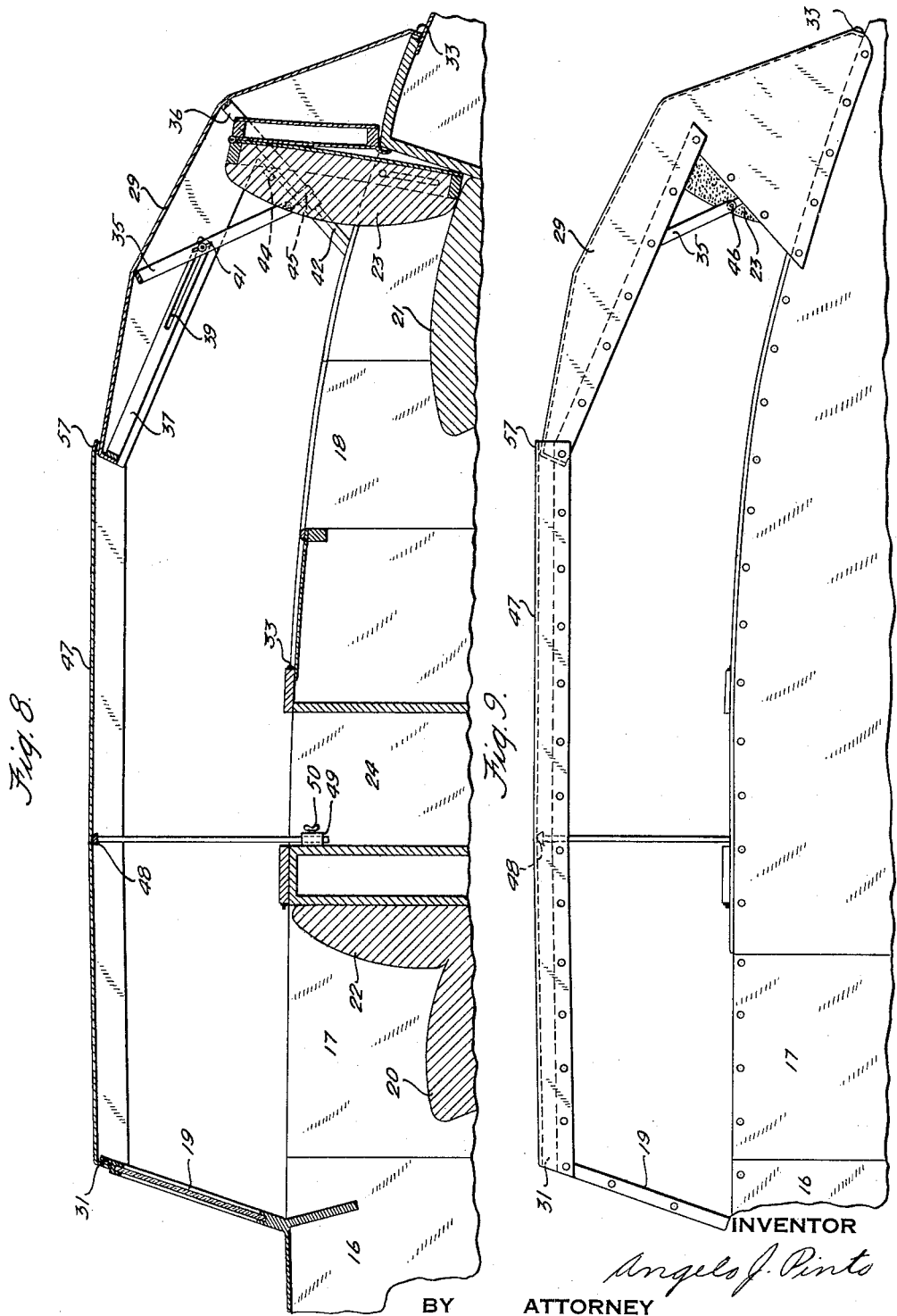

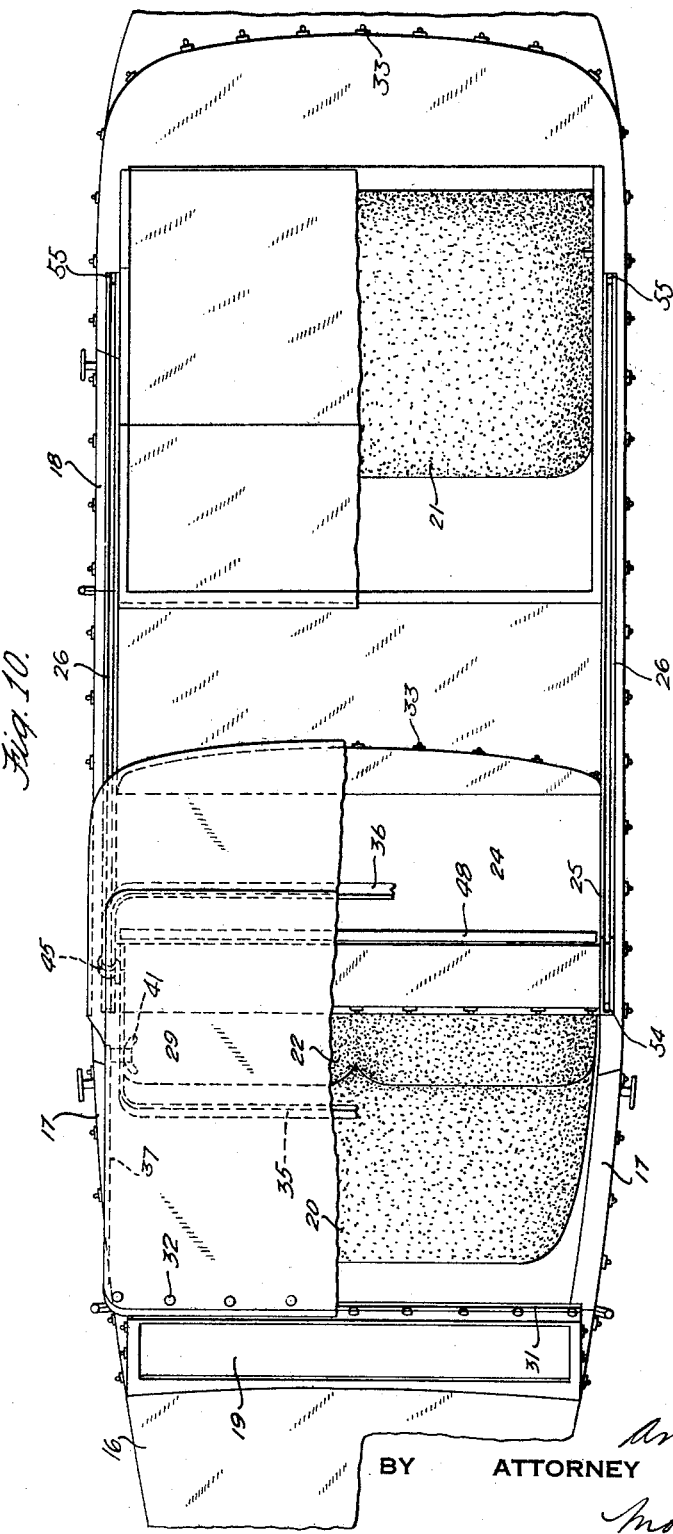

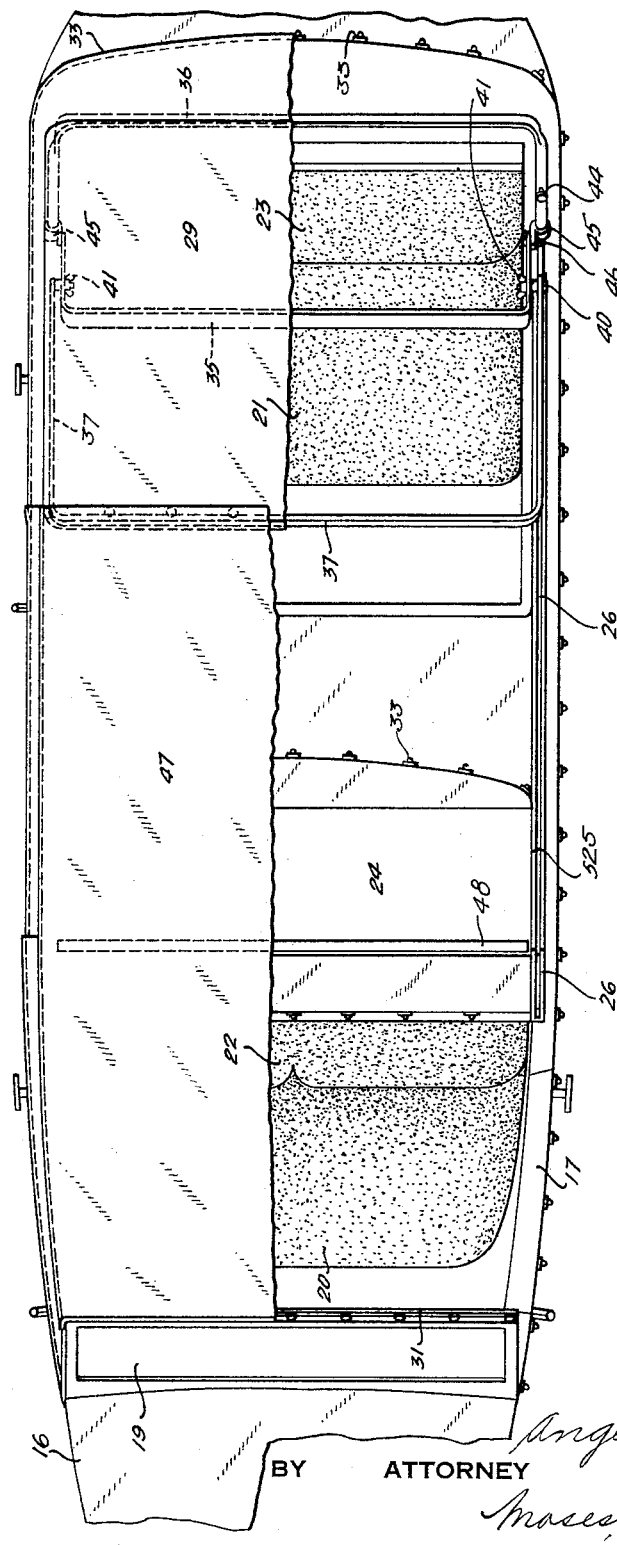

1,907,662

UNITED STATES PATENT OFFICE

ANGELO J. PINTO, OF ROSEBANK, NEW YORK

AUTOMOBILE TOP

Application filed October 22, 1931. Serial No. 570,319.

This invention relates to automobile tops and means for conveniently mounting the same in position when it is desired to use them, and readily putting the same in storage in vehicles in which they are used when it is desired to dismount them.

A principal object of the invention is to maintain the frame of the top in connected relationship with reference to its various parts whether the same is in mounted position or in storage, with means for holding the same rigid to the vehicle in which it is used when mounted in position.

Another principal object is to enable the entire top to be folded and compactly stored in the vehicle by provision in the storage chamber of suitable tracks or guides designed to control the stored position of the top.

Another principal object is to provide a top having the aforesaid advantages which may be alternately secured in place over the front seat of a vehicle or over both the front and rear seats thereof.

Another principal object of the invention is to provide a top frame which may be readily extended when it is desired to mount the top, and as readily collapsed when it is desired to store the same.

Other objects of the invention will be apparent from reading this specification in connection with the accompanying drawings, in which Figure 1 is a fractional, longitudinal, cross-sectional view of the body of a vehicle embodying my invention;

Figure 2 shows the vehicle top in packed condition in the storage chamber provided therefor;

Figure 3 is a fragmentary, longitudinal, cross-sectional view of a vehicle showing the track arrangement for the frame of the top;

Figure 4 is a similar view showing the top in place over the front seat of the vehicle;

Figure 5 is a fractional elevation of a vehicle showing the top in place over the front seat;

Figure 6 shows one of the side curtains used in my construction;

Figure 7 is a detail showing the method of fastening the side curtains to the top;

Figure 8 is a fractional, longitudinal, cross-sectional view of a vehicle in which the top is shown covering the front and back seats of the vehicle;

Figure 9 is a side elevation of the same;

Figure 10 is a plan view of the vehicle in which the top is shown in position over the front seat, part of the top having been broken away;

Figure 11 is a similar view to Figure 10 except that the top extends over both the forward and rear seats of the vehicle;

Figure 12 shows the arrangement of the side curtains;

Figure 13 represents the cover of the storage chamber for the top;

Figure 14 is an elevation of a top supporting rod; and

Figure 15 is a cross-section taken along the line 15—15 of Figure 14, looking in the direction of the arrows.

Referring now in detail to the drawings in which similar characters refer to similar parts throughout, 16 represents a vehicle having doors 17 and 18 and a windshield 19. Seats are shown at 20, 21 as well as the seat backs 22 and 23, all of which are conventional with present motor car construction.

In Figure 1 the vehicle top is shown stored in the storage chamber 24 where the top is adapted to be kept when not in use. Tracks 25 are provided in the storage chamber 24 to permit the convenient folding of the top in stored condition. These tracks are a continuation of the tracks 26 in which the supports for the top are adapted to slide and be locked in position, as will be hereinafter described.

By reference to Figure 4, it will be seen that the cover 29 of the vehicle top is in position over the forward or driver's seat of the vehicle and does not extend over the rear seat thereof. This cover is fastened at its forward end to the frame 31 of the windshield 19, by buttons 32 or other convenient fastening, as shown in Figure 10. The rear portion of this cover is similarly secured at 33 behind the top storage chamber 24. Bows 35 and 36 are provided which constitute part of the frame of the top, and which are suitably mounted to hold the cover in mounted position. A link 37 also forms part of the frame of the top, and has a clamping member 38 which is removably clamped to the frame 31 of the windshield. This link is provided with a slot 39 through which extends a locking bolt 40 secured in the frame bow 35, a winged nut 41 being provided to clamp said link 37 to said bow 35 when the desired angular relationship between the two has been determined.

The bow 36 is provided with telescopic rods 42. These rods are splined with the bow and slide in the recesses 43 in the legs of the bow, and are adapted to be secured in adjusted position therein by the locking screw 44. The bow 35 is supported by brackets 45 on the legs of the bow 36, the said bow 35 being hinged to brackets at 46.

In Figure 8 the cover 29 is shown in position over the rear seat instead of over the forward seat only, as shown in Figure 4, the only difference in the mounting being that the rear end of the top is fastened behind the rear seat of the vehicle instead of behind the front seat of the vehicle, as just described, and the forward end of said top portion is secured to the supplemental cover section 47 which in turn is secured to the windshield frame 31 in a similar manner as has been shown with reference to the position of the top section as shown in Figure 4.

In the all-over construction shown in Figure 8, a bow 48 is provided to support the top as shown, the legs of said bow being adjustable in the slotted brackets 49 and set therein by the thumb-screws 50. The rods 42 of the bow 36 (Figure 14) are provided with T-ends 51 adapted to slide in the channelled tracks 26 and be retained therein by the flanges 53 of said tracks.

The operation of my invention is as follows. When the top is not in use, it is stored in the chamber 24 which is provided for that purpose, the T-rods 42 of the bow 36 being held in the tracks 25 of the storage chamber 24, one of such tracks being located at each side of the storage chamber longitudinal with the car.

When desired to put up the top, the same is withdrawn from the storage chamber 24, the T-rods 42 are moved along the tracks 25 until the T-ends 51 rest in the recesses 54 or 55. For the present, we will assume that it is desired to erect the top so as to cover the forward seat of the automobile only. In this case the T-ends 51 of the rods 42 rest in the recess 54. The rear cover 29 is then fastened behind the driver's seat 33 and the forward end of this cover is fastened to the upper frame 31 of the windshield. The bow 36 is then extended on the rod 42 to hold the cover 29 in taut condition and the lock screw 44 is manipulated to hold the rod 42 and bow 36 in integral condition. The bow 35 is then swivelled upward as far as it will go and locked in position to the link 37, such locking being done by manipulation of the winged nut 41, the link 37 being clamped to the windshield 31. The frame of the top is thus held in firm condition as a unitary structure.

Assuming now that it is desired to extend the top over both seats of the vehicle shown in the drawings, the top is withdrawn from the storage chamber 24 as already described and the T-ends 51 of the rod 42 are moved along the tracks 26 until they lodge in the recesses 55. The rear cover 29 is then fastened behind the rear seat of the car and the bows 35 and 36 are secured in position in the same manner as already described with reference to the mounting of the top for the front seat only. A supplemental cover 47 is then secured at 57 in any convenient manner to the front of the cover 29 just described, and the forward end of this supplemental cover is secured to the windshield 31 in the same manner. A supplemental bow 48 is provided to support the supplemental cover 47, said bow being held in position by the slotted brackets 49 in cooperation with the lock screws 50. When not in use, the lock screws 50 are loosened and the bow 48 is allowed to slide down the brackets 49, assuming a stored position in the storage chamber 24.

When the top is in mounted position, side curtains 58, 59 and 60 are buttoned or otherwise secured in place. The detail of this fastening is shown in Figure 7 where a flap 61 is shown on the cover 29 (or 47 where it is the supplemental cover), forming a pocket 62 in which the top marginal edges of the side curtains 60 (or 58 or 59) are secured in such manner as to prevent rain from entering between the side curtains and the top cover.

I have described what I believe to be the best embodiment of my invention. I do not wish to be limited, however, in patent protection to the embodiment shown and described, but what I desire to cover by Letters Patent is set forth in the appended claims.

I claim:

1. A vehicle top comprised of a cover and a collapsible frame, in combination with a vehicle body having front and rear seats and a storage chamber, guides in said storage chamber, extending forwardly and rearwardly therefrom means on the frame for connecting said frame in operable relationship with said guides and adapting said frame to be moved in said guides to storage position in said storage chamber and to support the frame and cover in mounted position over the front or rear seat as desired, and means for securing said frame in position when mounted.

2. In combination, an automobile body having a front seat, a collapsible rear seat, a storage chamber disposed immediately behind said front seat, a pair of channel guides disposed in said chamber and extending forwardly and rearwardly therefrom, and a vehicle top comprised of a cover and a collapsible frame, said collapsible frame comprising a bow having its ends disposed in said channel guides and movable therealong to support the frame and cover in mounted position over the front seat or rear seat as desired or to storage position in said storage chamber.

In testimony whereof I have affixed my signature to this specification.

ANGELO J. PINTO.